United States Patent [19]

Hoppey

[11] 3,971,485

[45] July 27, 1976

[54] FORKLIFT ATTACHMENT

[76] Inventor: Thomas Hoppey, 142 Carlton Ave., Hazelton, Pa. 18201

[22] Filed: Nov. 26, 1974

[21] Appl. No.: 527,496

[52] U.S. Cl. .................. 214/313; 214/620; 214/653; 294/88

[51] Int. Cl.[2] .................. B65G 65/34; B66F 9/18

[58] Field of Search .......... 214/312, 313, 314, 620, 214/621, 652, 653; 294/88

[56] References Cited

UNITED STATES PATENTS

| | | | |
|---|---|---|---|
| 2,645,372 | 7/1953 | Broersma | 214/652 |
| 2,683,546 | 7/1954 | Sherriff | 214/653 X |
| 2,706,060 | 4/1955 | Ferrario | 214/652 |
| 2,755,949 | 7/1956 | Schenkelberger | 214/652 |
| 2,904,202 | 9/1959 | Brady | 214/653 |
| 3,227,299 | 1/1966 | Draxler | 214/653 |
| 3,438,523 | 4/1969 | Vik | 214/313 |
| 3,448,880 | 6/1969 | Howard | 214/620 |
| 3,472,404 | 10/1969 | Ord | 214/313 |
| 3,506,148 | 4/1970 | Vik | 214/620 |

*Primary Examiner*—L. J. Paperner
*Attorney, Agent, or Firm*—Mason, Fenwick & Lawrence

[57] ABSTRACT

An attachment for a conventional forklift for enabling the lifting and pivoting of elongated containers such as barrels is disclosed, including a base frame means having connection means for connection to the forks of a forklift, first and second spaced pivotal hydraulically operated container clamp jaw members on the frame, and hydraulic tilt means for pivoting the container clamp jaws to enable pouring from a container.

2 Claims, 6 Drawing Figures

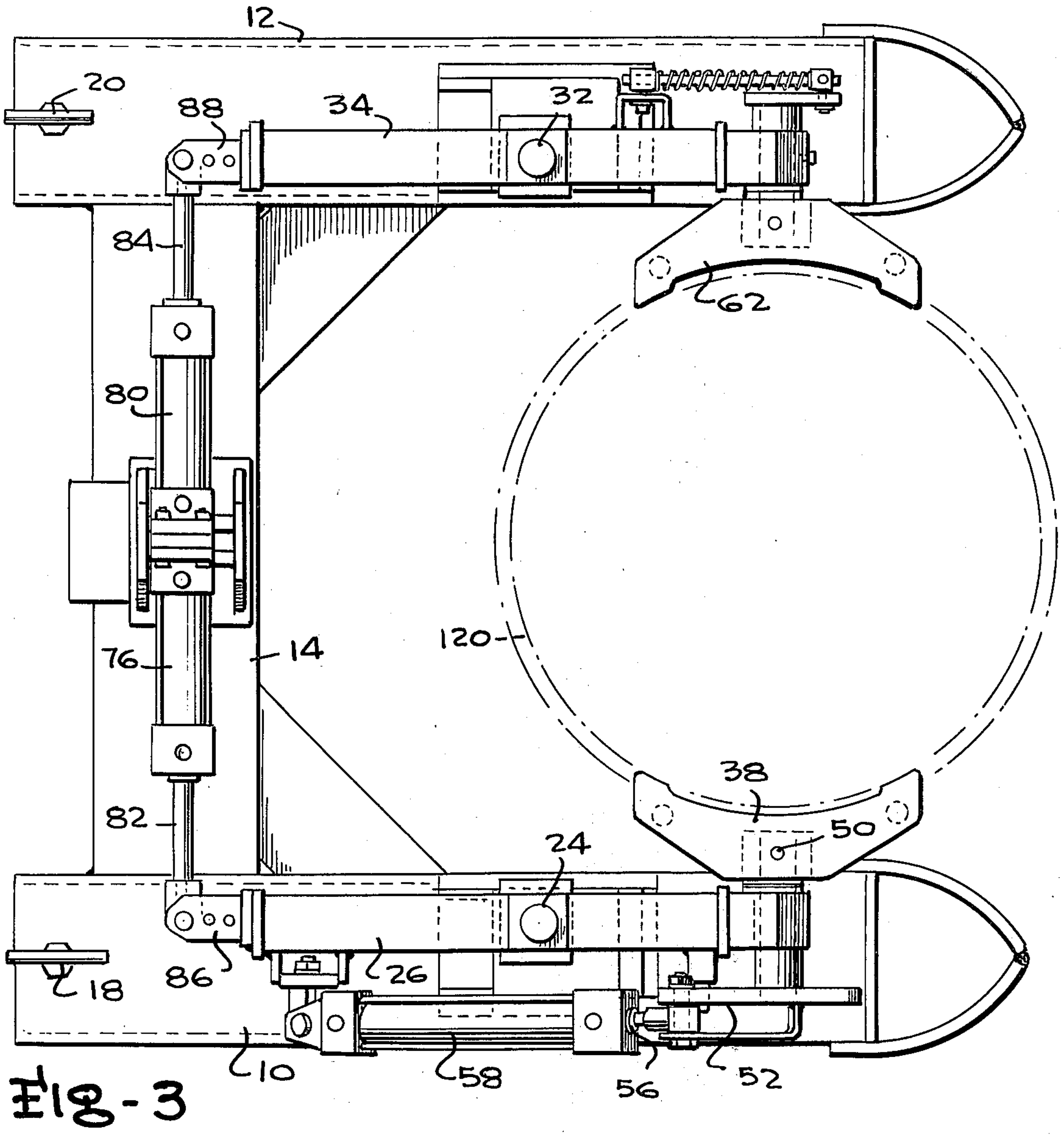
Fig-3
Fig-4
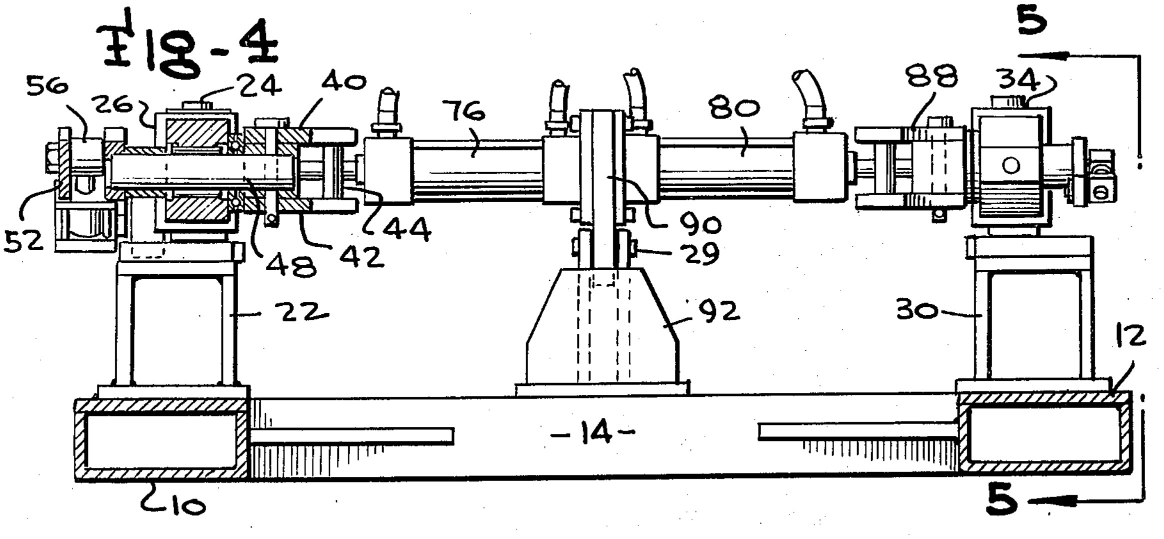

FORKLIFT ATTACHMENT

This invention is in the field of power-driven article handling equipment and is specifically directed to a unique attachment capable of being mounted on the forks of a conventional forklift truck for enabling the lifting and handling of barrels, drums, or similar cylindrical items.

Even more specifically, the present invention is directed to a unique apparatus which permits the lifting and handling of barrels or drums by a conventional forklift truck and also permits the tilting of the barrel or drum to enable the pouring of the contents from the lifted barrel or drum.

While a number of specialized devices have evolved for the handling of barrels and drums, such devices have been complicated and highly specialized and frequently incapable of being used for other purposes.

Storing and manufacturing facilities frequently require the handling of barrel or drum members along with other items easily handled by forklift trucks. In the case of manufacturing facilities, the pouring of the contents from the drum members is frequently required. Such facilities frequently have forklift truck members for moving and positioning items on pallets or the like which cannot be used for handling drums. It is consequently necessary to have specialized handling equipment for the drums and barrels which equipment is frequently idle to result in an expensive operation particularly in installations in which special drum handling equipment is intermittent.

Therefore, it is the object of this invention to provide a new and improved means capable of engaging, lifting and tilting barrel or drum type containers.

Yet another object of the invention is the provision of a new and improved attachment mountable on a conventional forklift truck for enabling the handling and tilting of drum or barrel type containers.

Achievement of the foregoing objects is enabled by the preferred embodiment of the invention through the provision of a base frame member of generally U-shaped construction including first and second hollow fork sleeve members dimensioned to respectively fit over the fork members of a conventional forklift. The fork sleeve members are connected adjacent their inner ends by a transversely extending base connecting frame member to provide a unitary U-shaped frame component mounted on the forklift. Clamp members provided adjacent the inner ends of the fork sleeve portions of the U-shaped frame clamp the sleeve portions to the fork members for retention thereon.

Each of the fork sleeve members includes means providing a vertically extending clamp arm pivot pin extending medially through a horizontal clamp arm which includes a container clamp jaw member at its outer end. The respective container clamp jaw members face inwardly toward each other and pivotal movement of the clamp arms in opposite directions effects a clamping operation on a barrel or the like positioned between the container clamp jaw members. Each container clamp jaw member is mounted on a clamp jaw pivot shaft extending in a horizontal direction transversely through the outer end of each of the clamp arms and the clamp jaw pivot shaft of one of the clamp jaws is connected to a tilt cylinder mounted on one of the clamp arms and operable for effecting a tilting of the clamp jaw about the horizontal axis of the pivot shaft on which it is mounted to effect a tilting of a barrel or the like contained between the clamp jaws. Such a tilting operation would normally be for the purpose of pouring the contents or possibly for positioning the barrel for storage in a horizontal manner.

Additionally, first and second hydraulic cylinders have their base ends connected to the base connecting frame member and have their piston rods connected to the inner ends of the clamp arms for effecting pivotal movement of the clamp arms for clamping and unclamping functions. The clamp cylinders are operable in unison and the connection of the ends of the piston rods to the clamping arms is adjustable for effecting an adjustment of the spacing between the container clamp jaw members on the opposite ends of the clamping arms.

A better understanding of the manner in which the preferred embodiment of the invention achieves the objects of the invention will be understood when the following written description is considered in conjunction with the appended drawings in which:

FIG. 3 is a top plan view of the preferred embodiment illustrating the clamping members in clamping relation to a drum;

FIG. 4 is a sectional view taken along lines 4—4 of FIG. 2;

Figure 1:
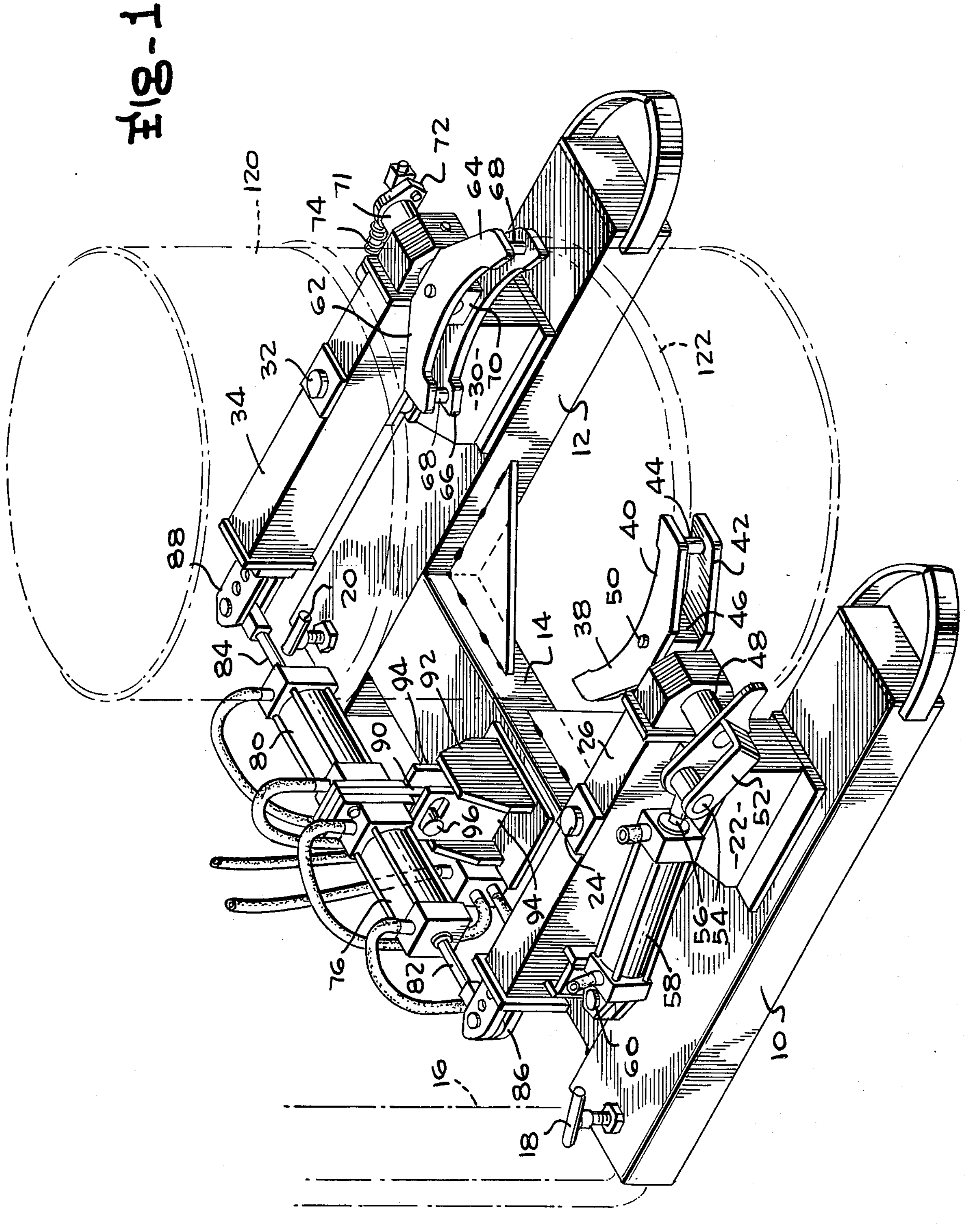
FIG. 1 is a perspective view of the preferred embodiment.
Figure 2:
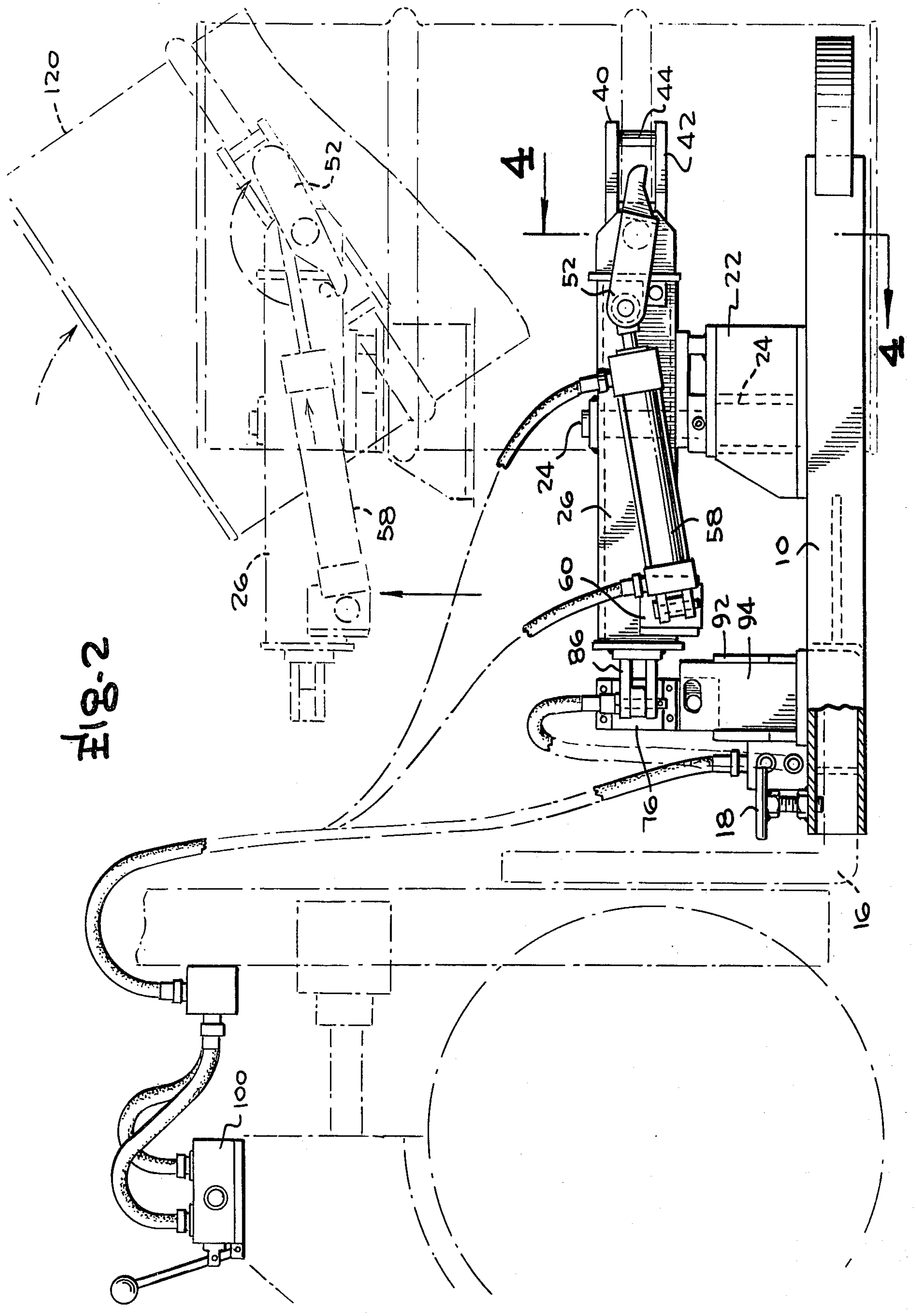
FIG. 2 is a side elevation view of the preferred embodiment.

Turning first to FIG. 1, the preferred embodiment comprises a U-shaped base frame consisting of a first fork sleeve 10, a second fork sleeve 12 and a transverse base connecting frame 14, all of which are unitarily mounted on the fork members 16 of a conventional forklift truck. First and second connection means comprising threaded clamp rods 18 and 20 are respectively mounted adjacent the inner ends of the fork sleeves 10 and 12 for retaining the fork sleeves in unitary base connecting frame member 14 on the fork member 16. It should be noted that the fork sleeve members 10 and 12 are of rectangular cross-section and are dimensioned to be easily positioned over or removed from the fork member 16. However, actuation of the clamp rod members 18 and 20 serves to retain the fork sleeves in position on the fork members in an obvious manner, as will be seen from inspection of FIG. 2.

A first clamp arm support bracket 22 extends upwardly from the surface of the first fork sleeve 10 and includes a first vertical clamp arm pivot pin 24 which provides pivotal support for a first clamp arm 26 as best shown in FIG. 1. Similarly, a second clamp arm support bracket 30 is fixedly connected to and extends upwardly from the upper surface of the second fork sleeve 12 and includes a second vertical clamp arm pivot pin 32 which extends medially through a second clamp arm 34.

A first container clamp jaw member 38 consisting of upper and lower arcuate clamp plates 40 and 42 joined by end spacer rods 44 is mounted on the square end 46 of a first container clamp jaw pivot shaft 48 extending horizontally through the outer end of the first clamp arm 26. The first container clamp jaw 38 is also mounted for pivotal movement about a rocker pin 50 extending through the square end portion of the clamp jaw pivot shaft 48. A tilt lever arm 52 is mounted on the end of pivot shaft 48 opposite the square end 46 to which the clamp jaw 38 is connected and includes an eccentric connector pin 54 which is eccentric with respect to pivot shaft 48 and to the end of which a hydraulic cylinder power actuator rod 56 of a tilt cylinder 58 is pivotally connected. The base end of tilt cylinder 58 is pivotally connected to the inner end of the first clamp arm 26 by means of a pivot bracket generally designated 60. It will be seen that actuation of tilt cylinder 58 will serve to pivot lever arm 52 and clamp jaw pivot shaft 48 about the axis of shaft 48 along with the first container clamp jaw 38 in an obvious manner.

A second container clamp jaw 62 is mounted on the second clamp arm 34 in a manner essentially identical to the first container clamp jaw and includes upper and lower clamp plates 64 and 66 connected at their inner ends by spacer rods 68 and mounted on the square end 70 of a second clamp jaw pivot shaft 71. Pivot shaft 71 is provided with a positioning lever 72 acted on by a coil spring 74 on a guide rod 75 to normally position the second container clamp jaw 62 in a horizontal manner as illustrated in FIG. 1. However, the spring 74 can be overcome to permit the second container clamp jaw member 62 to pivot about the axis of pivot shaft 71 in an obvious manner during the tilting of a drum clamped between clamp jaw 62 and clamp jaw 38 in a manner discussed hereinafter.

Pivotal movement of the first and second clamp arms 26 and 34 is respectively effected by a first clamp cylinder 76 and a second clamp cylinder 80 each having respective actuator rods 82 and 84 respectively connected to clevis members 86 and 88 on the rear ends of arms 26 and 34. Each of the clevis members is provided with a plurality of apertures enabling adjustment of the connection to the rods 84 and 82 to adjust the spacing between clamp jaws 38 and 62 as well as the degree of pivotal movement imparted to the arms 26 and 34 by actuation of cylinders 76 and 80. The base ends of cylinders 76 and 80 are connected to a swing plate 90 mounted for restrained movement in an upwardly extending bracket 92 mounted on the upper surface of the transverse base connecting frame member 14 and including parallel plates 94 each having an aperture through which a retaining pin 96 mounted in swing plate 90 extends.

Therefore, it will be apparent that swing plate 90 is capable of movement between the plates 94 to accommodate movement of the cylinders 76 and 80 necessary upon outward or inward pivotal movement of the clamp arms 26 and 34.

Figure 6:
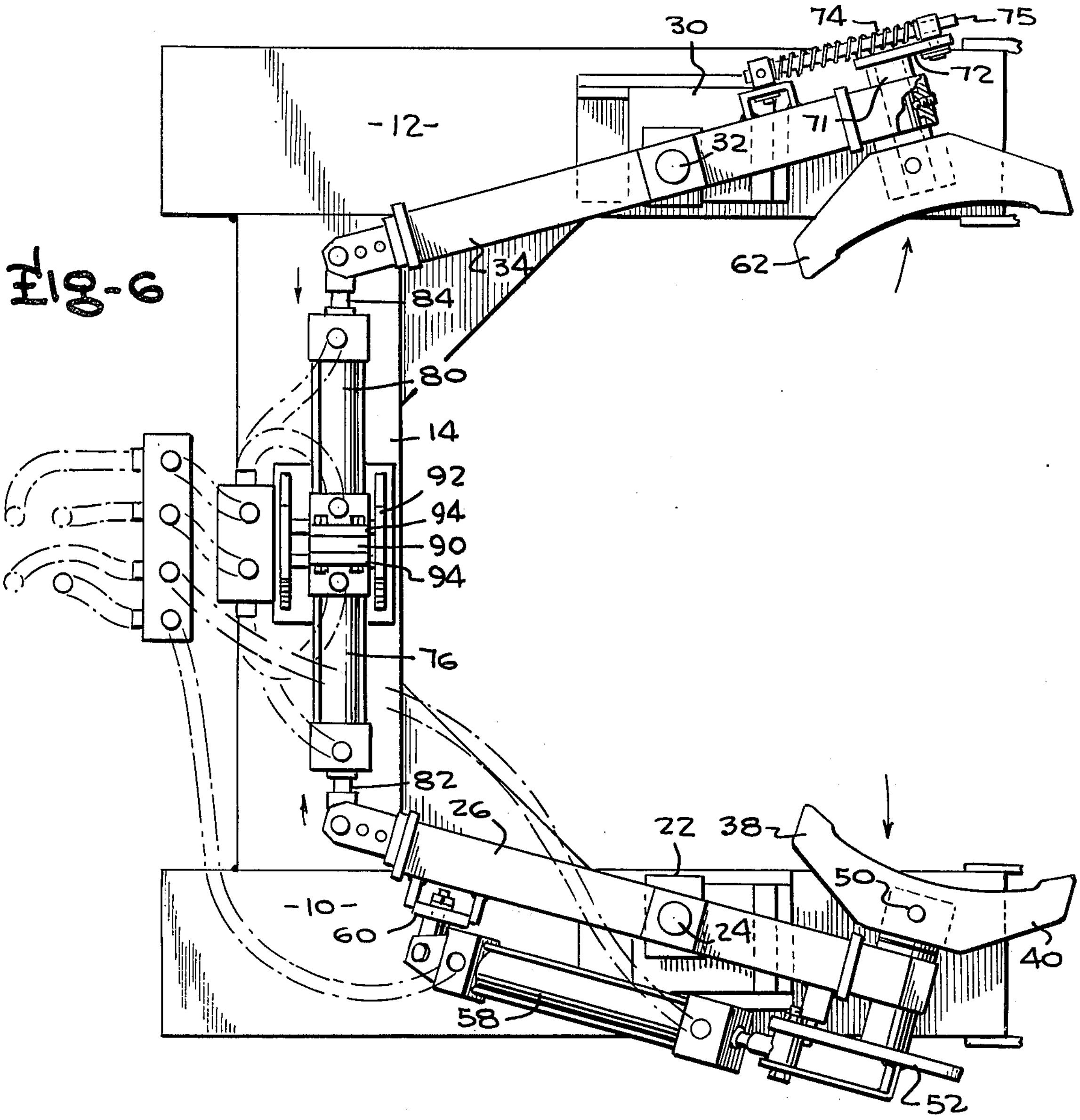
FIG. 6 is a top plan view similar to FIG. 3 but illustrating the clamping members in a retracted unactuated position.
Figure 5:
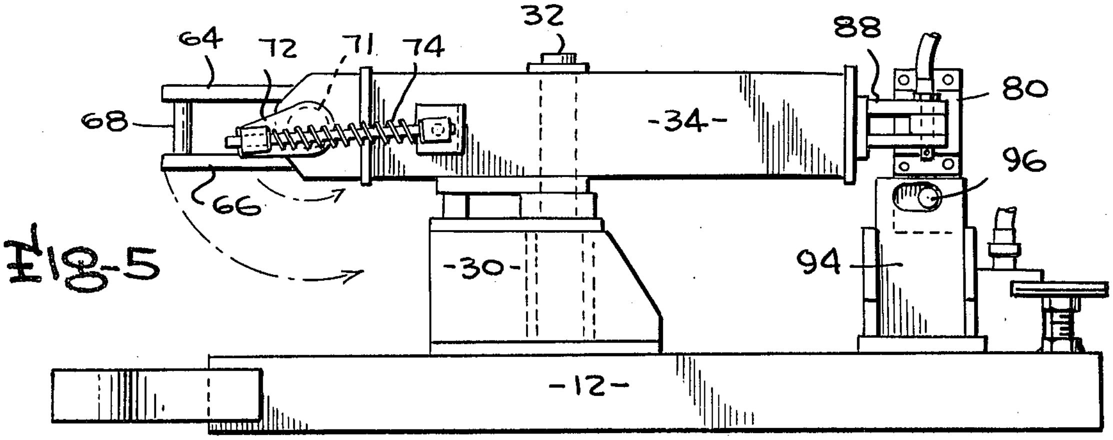
FIG. 5 is a sectional view taken along lines 5—5 of FIG. 4.

In operation, the apparatus is attached to the fork 16 of a conventional forklift truck having a hydraulic power supply connected by hose members and conventional control valve means 100 (FIG. 2) to the cylinders 58, 76 and 80 for effecting controlled actuation of the various cylinders for the control functions for which they are intended. Cylinder 58 is unactuated (retracted) so that the first container clamp jaw 38 is oriented in a horizontal manner as shown in FIG. 1 and cylinders 76 and 80 are actuated to their extreme retracted position illustrated in FIG. 6 so that the clamp jaws 38 and 62 are spaced outwardly apart to the fullest extent possible. The forklift is then maneuvered to position a drum or barrel 120 illustrated in dashed lines in FIG. 1 between the container clamp jaw members 38 and 62. The fork members 16 are actuated by the conventional forklift height controls to elevate or lower the clamp jaw members 32 and 62 to achieve proper alignment with the container. In the case of a drum, such as drum 120 having a radial outwardly extending ridge 122, the clamp jaws would be aligned with the ridge so that the upper plates 40 and 64 would engage the drum above the ridge 122 while the lower plates 42 and 66 would engage the drum below the ridge 122 as shown in FIG. 1. Cylinders 76 and 80 are actuated to extend their power rods outwardly and consequently provide an inward clamping operation of the clamp jaw members 38 and 62. When the drum has been clamped in position, the entire assembly can be lifted by operation of the conventional fork members 16 and the drum transported to a desired location. After reaching the desired location, the drum can be pivoted by operation of the tilt cylinder 58 if desired. It will be seen that operation of the tilt cylinder 58 pivots member 52 and the first clamp jaw 38. Since the drum provides what amounts to a fixed connection between the first clamp jaw 38 and the second jaw 62, clamp jaw 62 is also pivoted against the relatively weak bias of spring 74 upon actuation of cylinder 58. Tilting movement of the drum is illustrated in dashed lines in FIG. 2.

One extremely great advantage of the inventive structure is that it enables a pivoting of a barrel or other similar container through 170 degrees from its original vertical orientation to enable a complete pouring of the contents therefrom.

Therefore, it will be seen that the subject invention enables a great increase in the utility of a conventional forklift truck in a relatively simple manner. Moreover, the subject invention can easily be removed from the forklift truck in a few minutes with practically no down time resulting from conversion from conventional forklift truck operation to the barrel lift operation or vice versa.

It should be understood that many obvious modifications of the preferred embodiment of the invention will occur to those of skill in the art and the spirit and scope of the invention is therefore to be limited solely by the appended claims.

I claim:

1. Attachment means for mounting on a conventional forklift for enabling the lifting and tilting of elongated containers such as barrels, drums or the like, said attachment means comprising base frame means including connection means enabling supported attachment of said base frame means on the forks of a forklift, wherein said base frame means includes first and second fork sleeve members dimensioned and spaced to fit over first and second fork members of a forklift, wherein said connection means includes first and second threaded rods respectively mounted in said first and second fork sleeves and operable for effecting a clamping of said fork sleeves to a fork on which said fork sleeves are respectively mounted, a transverse base frame connection member connected to and extending between the first and second fork sleeve members at a position adjacent the inner end of the fork sleeve members so that said transverse base frame connection member and said fork sleeve members comprise a unitary generally U-shaped frame, first and second spaced container clamp jaw members, first and second container clamp jaw support means mounted on said base frame means for supporting said first and second container clamp jaw members for movement in a horizontal plane toward or away from each other for enabling a clamping of a container between said container clamp jaw members or for releasing said clamp jaw members from a clamped container, said clamp jaw support means including first and second coaxial pivot members on which said first and second container clamp jaw means are respectively mounted for pivotal movement about a horizontal axis coextensive with the axis of said pivot members, a first clamp arm means, means mounting said first clamp arm on said first fork sleeve for pivotal movement about a vertical axis medially of the first clamp arm and which vertical axis is oriented generally perpendicular to said first fork sleeve, said first pivot member being mounted for pivotal movement adjacent the outer end of said first clamp arm, a second clamp arm, second clamp arm support means supporting said second clamp arm for pivotal movement about a vertical axis medially of said second clamp arm, said second pivot member being mounted adjacent the outer end of said second clamp arm, clamping function power actuator means mounted on said base frame means for actuating said container clamp jaw support means to selectively move said container clamp jaw members toward or away from each other, said clamp function power actuation means comprising a pivot plate mounted for pivotal movement on said base frame and connection member, first and second hydraulic cylinder means coaxially mounted on opposite sides of said pivot plate and respectively having first and second piston rod means connected to the inner ends of said first and second clamp arms for effecting pivotal movement of said first and second clamp arms in opposite directions to provide a clamping or unclamping function with respect to a container or other object positioned between said first and second container clamp jaw members, tilting function power actuator means for pivoting said tilting function power actuator means for pivoting said clamp jaw members about the axis of said pivot members to effect a tilting of container means clamped between said container clamp jaw members, wherein said first pivot member comprises a first pivot shaft extending through bearing means adjacent the outer end of said first clamp arm, said tilting function power actuator means includes a third hydraulic cylinder, said third hydraulic cylinder being mounted on said first clamp arm, an eccentric means mounted on said first pivot shaft, and means providing a connection between said eccentric means and the outer end of the rod of said third hydraulic cylinder whereby actuation of said third hydraulic cylinder pivots said pivot shaft and said first container clamp jaw member and wherein said second pivot member comprises a second pivot shaft mounted in bearing means on the outer end of said second clamp arm and further including biassing means normally maintaining said second pivot shaft in a position in which said second container clamp jaw members is oriented horizontally for permitting rotation of said second clamp jaw upon actuation of said third hydraulic cylinder when a container is clamped between said container clamp jaw members.

2. The invention of claim 1 wherein each of said clamp jaw members includes an upper clamp plate and a lower clamp plate respectively spaced apart in parallel alignment to each other.

* * * * *